United States Patent
Hsu

(10) Patent No.: US 8,208,621 B1
(45) Date of Patent: Jun. 26, 2012

(54) SYSTEMS AND METHODS FOR ACOUSTIC ECHO CANCELLATION

(75) Inventor: Wei-Hao Hsu, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 1156 days.

(21) Appl. No.: 12/038,162

(22) Filed: Feb. 27, 2008

Related U.S. Application Data

(60) Provisional application No. 60/979,416, filed on Oct. 12, 2007.

(51) Int. Cl.
*H04M 9/08* (2006.01)
(52) U.S. Cl. .................................. 379/406.05
(58) Field of Classification Search ............. 379/406.05
See application file for complete search history.

(56) References Cited

U.S. PATENT DOCUMENTS

| | | | |
|---|---|---|---|
| 4,669,116 A | 5/1987 | Agazzi et al. | |
| 5,561,668 A | 10/1996 | Genter | |
| 5,699,424 A | 12/1997 | Hirano | |
| 6,442,275 B1 * | 8/2002 | Diethorn | 379/406.14 |
| 6,574,336 B1 | 6/2003 | Kirla | |
| 6,744,884 B1 | 6/2004 | Bjarnason | |
| 6,766,292 B1 * | 7/2004 | Chandran et al. | 704/224 |
| 7,031,459 B2 | 4/2006 | Laberteaux | |
| 7,062,040 B2 | 6/2006 | Faller | |
| 2004/0170283 A1 * | 9/2004 | Terada et al. | 381/66 |

* cited by examiner

*Primary Examiner* — Alexander Jamal
(74) *Attorney, Agent, or Firm* — Thomas|Kayden

(57) ABSTRACT

Acoustic echo cancellation methods are provided, in which first and second suppression gains of first and second sub-bands of an $N^{th}$ acoustic frame are generated, and the second suppression gain of the second sub-band of the $N^{th}$ acoustic frame is adjusted according to the first suppression gain of the first sub-band of the $N^{th}$ acoustic frame.

17 Claims, 7 Drawing Sheets

| Lower Limit | Upper Limit | Adjustment Value |
|---|---|---|
| $\infty$ | $\alpha_1$ | $\beta_0$ |
| $\alpha_1$ | $\alpha_2$ | $\beta_1$ |
| $\alpha_2$ | $\alpha_3$ | $\beta_2$ |
| $\alpha_3$ | $\alpha_4$ | $\beta_3$ |
| $\alpha_4$ | $\alpha_5$ | $\beta_4$ |
| $\alpha_5$ | 0 | $\beta_5$ |

FIG. 6

SYSTEMS AND METHODS FOR ACOUSTIC ECHO CANCELLATION

CROSS REFERENCE TO RELATED APPLICATIONS

This application claims the benefit of U.S. Provisional Application No. 60/979,416, filed Oct. 12, 2007, and entitled "SYSTEMS AND METHODS FOR ACOUSTIC ECHO CANCELLATION".

BACKGROUND OF THE INVENTION

1. Field of the Invention

The invention relates to acoustic echo cancellation (AEC), and more particularly, to systems and methods for acoustic echo cancellation.

2. Description of the Related Art

Acoustic echo arises when sound from a loudspeaker (e.g. the earpiece of a handset) is picked up by a microphone (e.g. the mic in the same handset). The problem exists in any communications scenario where there is a speaker and a microphone close thereto. Direct sound from the loudspeaker (not the person at the far end, otherwise referred to as the talker) enters the microphone mostly unaltered, which is referred to as direct acoustic path or linear echo. The difficulties in canceling acoustic echo stem from the alteration of the original sound by the ambient space. The alteration colors the sound that re-enters the microphone. The changes can include certain frequencies which are absorbed by soft furnishings, and reflection of different frequencies at varying strength. The secondary reflections are not strictly referred to as echo, but rather reverberation. Acoustic echo is heard by the far end talker in a conversation. So if a person in Room A talks, they will hear their voice bounce around in Room B, which is referred to as nonlinear echo. If the echo is not cancelled, it will be transmitted back to its origin. Due to slight round-trip transmission delay, the acoustic echo is very distracting.

BRIEF SUMMARY OF THE INVENTION

Embodiments of an acoustic echo cancellation method are provided, in which first and second suppression gains of first and second sub-bands of an $N^{th}$ acoustic frame are generated, and the second suppression gain of the second sub-band of the $N^{th}$ acoustic frame is adjusted according to the first suppression gain of the first sub-band of the $N^{th}$ acoustic frame.

The invention provides an embodiment of an acoustic echo cancellation method, in which first and second suppression gains of first and second sub-bands of an $N^{th}$ acoustic frame are generated. An energy ratio of near end acoustic signals which have undergone linear acoustic echo cancellation to far end acoustic signals of the second sub-band of an $M^{th}$ acoustic frame is updated by that of the $N^{th}$ acoustic frame for adjusting the second suppression gain of the second sub-band of a $K^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, wherein M<N<K.

The invention provides an embodiment of an acoustic echo cancellation system, in which a nonlinear detection and adjustment unit is provided and comprises at least two preliminary suppression gain calculators generating first and second suppression gains of first and second sub-bands of an $N^{th}$ acoustic frame, and at least one nonlinear effect calculator adjusting the second suppression gain of the second sub-band of the $N^{th}$ acoustic frame according to the first suppression gain of the first sub-band of the $N^{th}$ acoustic frame with at least one adder.

The invention provides an embodiment of an acoustic echo cancellation system, in which a nonlinear detection and adjustment unit generates first and second suppression gains of first and second sub-bands of an $N^{th}$ acoustic frame, and a measure refresh unit updates an energy ratio of near end acoustic signals which have undergone a linear acoustic echo cancellation to far end acoustic signals of the second sub-band of an $M^{th}$ acoustic frame stored in a register by that of the $N^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, such that the suppression gain controller adjusts the second suppression gain of the second sub-band of a $K^{th}$ acoustic frame, wherein M<N<K.

BRIEF DESCRIPTION OF THE DRAWINGS

The invention can be more fully understood by reading the subsequent detailed description and examples with references made to the accompanying drawings, wherein:

FIG. 6 is a schematic diagram of an exemplary look-up table; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
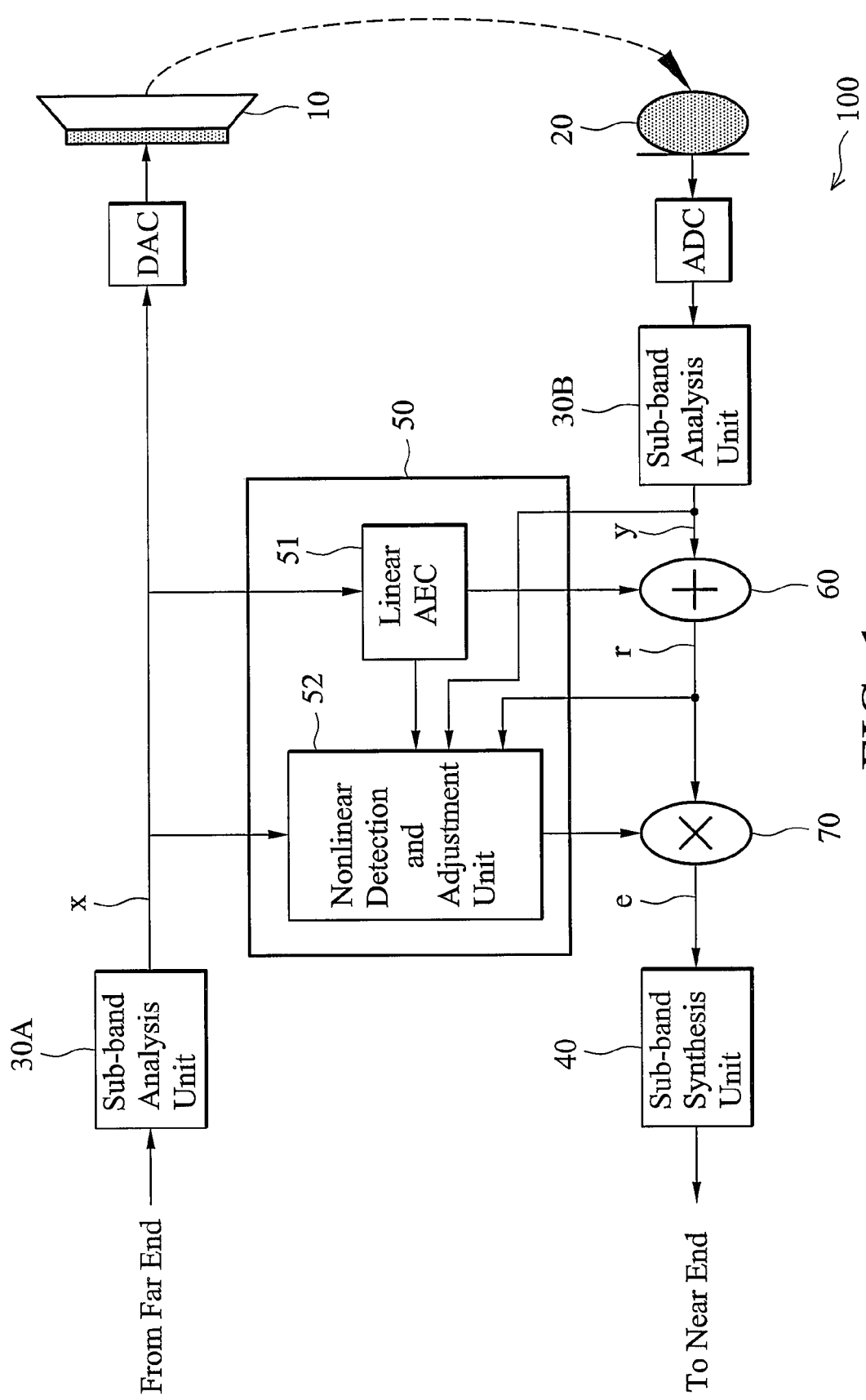
FIG. 1 is a schematic diagram of an embodiment of an acoustic echo cancellation (AEC) system.

FIG. 1 is a schematic diagram of an embodiment of an acoustic echo cancellation (AEC) system 100 mainly comprising a speaker 10, a microphone 20, two sub-band analysis units 30A and 30B, a sub-band synthesis unit 40, and an AEC processing unit 50. The AEC processing unit 50 comprises a linear acoustic echo canceller (called linear AEC) 51 and a nonlinear detection and adjustment unit 52. The acoustic echo cancellation system 100 may be disposed on a mobile station further comprising a radio frequency (RF) unit (not shown) and a baseband unit (not shown).

Figure 2:
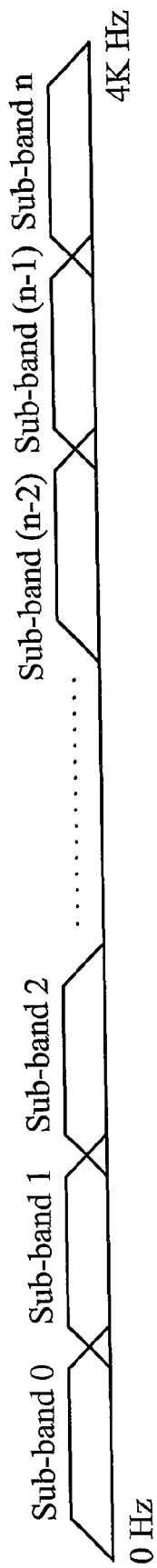
FIG. 2 is a schematic diagram of exemplary sub-bands.

Acoustic signals at the far end "x", ranging from 0 Hz to 4 kHz, are digitized and separated into several sub-bands by the sub-band analysis unit 30A, for example 7, 8, 9 or 10 sub-bands each with a relevant bandwidth (e.g. 400, 450, 500, 550 or 600 Hz), as shown in FIG. 2. Sub-band 0, the lowest sub-band, is typically omitted in signal processing. It is to be understood that the far end acoustic signals may be transmitted via a cellular network such as a global system for mobile communications (GSM), enhanced data rates for global evolution (EDGE), general packet radio service (GPRS), code division multiple access (CDMA), wideband code division multiple access (WCDMA) network and the similar, or a wireless network such as Wi-Fi, worldwide interoperability for microwave access (WiMAX) network and the similar, and acquired via the RF, baseband unit and digital signal processor (DSP) of the mobile station such as a mobile phone, a smart phone and the similar.

Acoustic signals at the near end "y", ranging from 0 Hz to 4 kHz, are picked up by the microphone 20, digitized and separated into the same sub-bands by the sub-band analysis unit 30B as that of the far end acoustic signals "x". Linear and nonlinear acoustic echo may arise when sound from the speaker 10 is picked up by the microphone 20, and may be encompassed in the near end acoustic signals. For each sub-band, the linear AEC 51 compares, as reference, far end acoustic signals "x" played by the speaker 10, with near end acoustic signals "y" picked up by the microphone 20, and performs cancellation with one or more adders 60 to remove the same patterns (i.e. hypothetic linear acoustic echo) from near end acoustic signals "y".

The nonlinear detection and adjustment unit 52 performs adaptive acoustic echo suppression gain control to sub-bands of acoustic frames of near end acoustic signals which have undergone linear echo cancellation "r" in order to cancel nonlinear echo therefrom with one or more multipliers 70 according to several reference magnitudes such as near end acoustic signals "y", near end acoustic signals which have undergone linear echo cancellation "r", signals from the linear AEC 51, and far end acoustic signals "x". The resultant near end acoustic signals "e" subsequently undergo sub-band synthesis for further processing, for example, transmission to a far end user via a cellular network or a wireless network.

Figure 3:
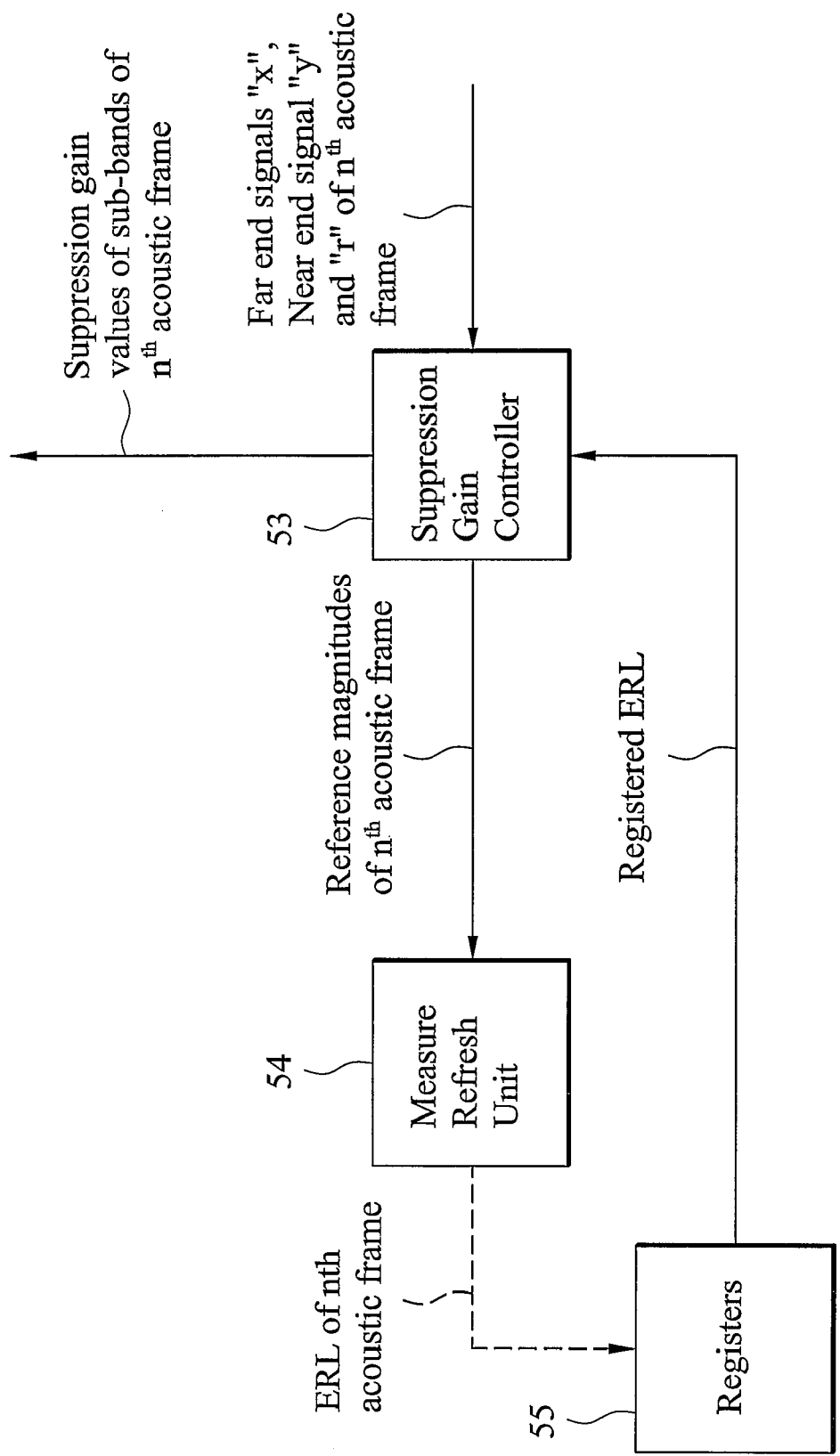
FIG. 3 is a schematic diagram of an embodiment of an acoustic echo cancellation (AEC) processing unit.

FIG. 3 is a schematic diagram of an embodiment of an AEC processing unit mainly comprising a suppression gain controller 53, a measure refresh unit 54 and one or more registers 55. For example, the suppression gain 53 can be disposed in the nonlinear detection and adjustment unit 52, and the measure refresh unit 54 and the registers 55 can be disposed in the linear AEC 51, but is not limited thereto. The registers 55 store echo return loss (ERL) values each corresponding to a particular sub-band. The registered ERL values are calculated during signal processing of one or more former acoustic frames. In order to cancel nonlinear echoes of a current acoustic frame, the suppression gain controller 53 determines suppression gains of sub-bands of the current acoustic frame according to at least far end and near end acoustic signals of the current acoustic frame, as well as, the registered ERL values. The measure refresh unit 54 acquires reference magnitudes of the current acoustic frame from the suppression gain controller 53, and accordingly determines whether refresh of ERL values of sub-bands is required for subsequent suppression gain control.

Figure 4:
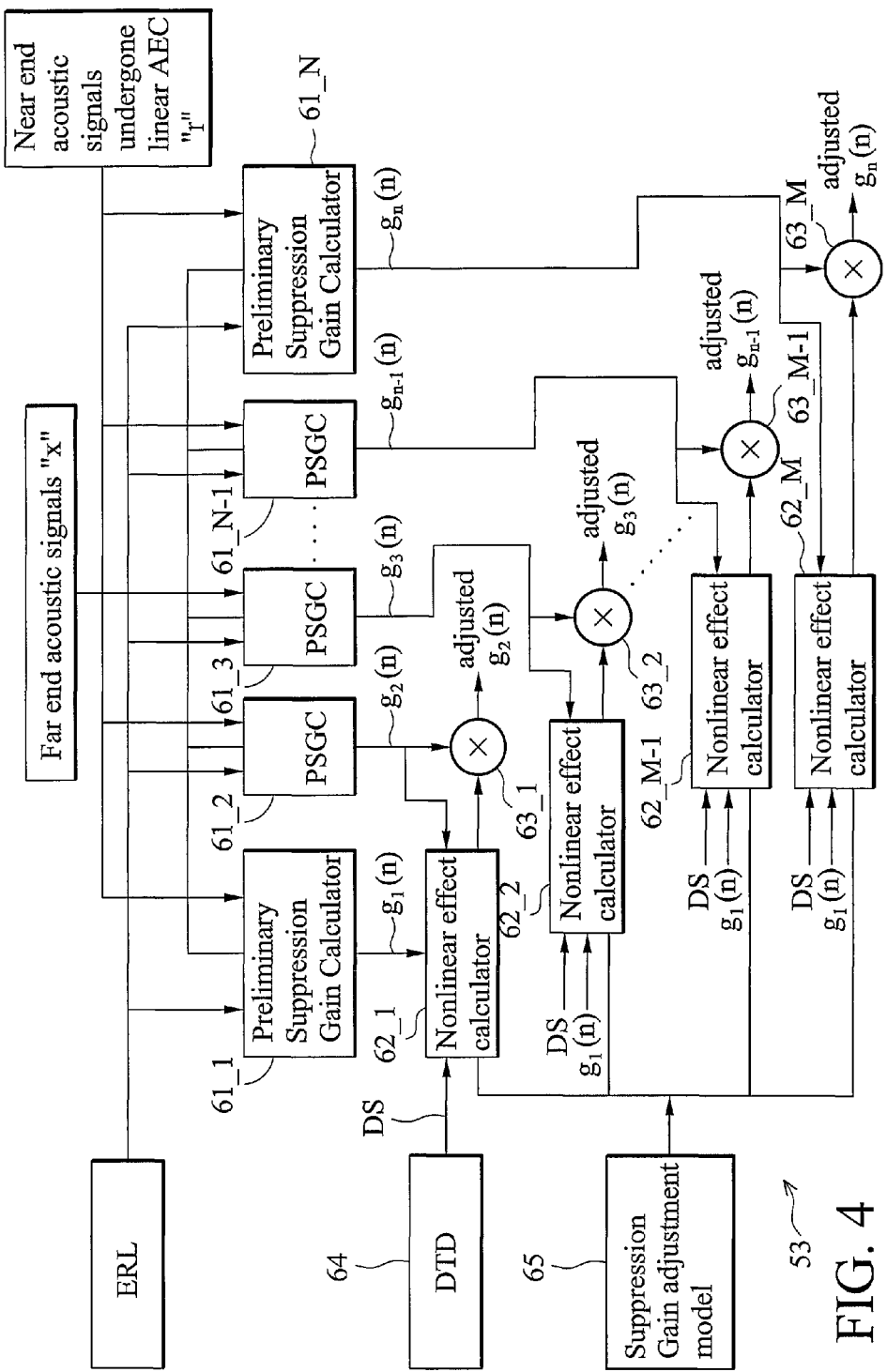
FIG. 4 is a schematic diagram of an embodiment of a suppression gain controller.

FIG. 4 is a schematic diagram of an embodiment of a suppression gain controller mainly comprising multiple preliminary suppression gain calculators 61_1~61_N, nonlinear effect calculators 62_1~62_M and multipliers 63_1~63_M, as well as, a double talk detector (DTD) 64 and a suppression gain adjustment model 65, in which M=N−1. With limited capabilities of speakers having relatively smaller-sized drivers (e.g. about 1 cm diameter driver), reproduction of lower frequencies are difficult, for example, for audio frequencies lower than 1 kHz, whereby nonlinear acoustic echoes in the lower audio frequencies are hardly ever present. Therefore, a calculated suppression gain value for the lower frequencies (i.e. lower sub-band) can be treated as a reference value, and suppression gain values for higher frequencies, for example over 1000 Hz, can be adjusted according to the reference value, resulting in improved removal of nonlinear acoustic echoes from higher frequencies of near end acoustic signals. The preliminary suppression gain calculator (61_1, 61_2, . . . , or 61_N) calculates a preliminary suppression gain for each sub-band by a formula:

$$g_{band}(n) = 1 - \frac{E_{band}^{x}(n) \times ERL_{band}}{E_{band}^{r}(n)};$$

accompanied with reference to FIG. 1, where n represents a current acoustic frame index, $g_{band}(n)$ represents a suppression gain for a particular sub-band of the $n^{th}$ acoustic frame, $E_{band}^{x}(n)$ represents a magnitude of a particular sub-band of the $n^{th}$ acoustic frame of far end acoustic signals (e.g. "x" of FIG. 1), $E_{band}^{r}(n)$ represents energy of near end acoustic signals which have undergone a linear acoustic echo cancellation of the particular sub-band of the $N^{th}$ acoustic frame, and $ERL_{band}$ represents an energy ratio of near end acoustic signals which have undergone linear AEC (e.g. "r" of FIG. 1) to far end acoustic signals (e.g. "x" of FIG. 1) of the sub-band of a former acoustic frame. The preliminary suppression gain calculator (61_1, 61_2, . . . , or 61_N) acquires $ERL_{band}$ from the register 55. The registered $ERL_{band}$ is generated during signal processing of a former acoustic frame. The $ERL_{band}$ of a particular sub-band may be represented by a formula:

$$ERL_{band}(m) = \frac{E_{band}^{r}(m)}{E_{band}^{x}(m)};$$

accompanied with reference to FIG. 1, where m represents a former acoustic frame index other than n, $E_{band}^{r}(m)$ represents an energy of near end acoustic signals of the sub-band of the $m^{th}$ acoustic frame which have undergone linear AEC (e.g. "r" of FIG. 1), and $E_{band}^{x}(m)$ represents an energy of far end acoustic signals of the sub-band of the $m^{th}$ acoustic frame (e.g. "x" of FIG. 1).

It is to be understood that the sub-band 1, a base sub-band, may be a sub-band with frequencies lower than 1000 Hz, for example, between 200 Hz and 800 Hz, 250 Hz and 750 Hz, 300 Hz and 600 Hz, or others, depending on the response of a speaker reproducing far end acoustic signals. The DTD 64 may use a well-known algorithm, such as shadow filter, statistics correlation or others, to detect whether doubletalk occurs and to generate a result signal DS, according to full bands of far end and near end acoustic signals (e.g. "x" and "y" of FIG. 1). It is also to be understood that DTD 64 may also detect that near end single talk or far end single talk occurs. The calculated suppression gain of sub-band 1, denoted as $g_1(n)$, is considered as a reference value applied to calculation of adjusted suppression gains $g_2(n)$—$g_n(n)$ for sub-bands with higher frequencies, such as sub-band 2 to sub-band N, where N represents a total number of sub-bands minus one. Each nonlinear effect calculator (62_1, 62_1, . . . , or 62_M) determines an adjustment value of a particular sub-band of the $n^{th}$ acoustic frame, denoted as $\beta_{band}(n)$, based on different situations.

Figure 5:
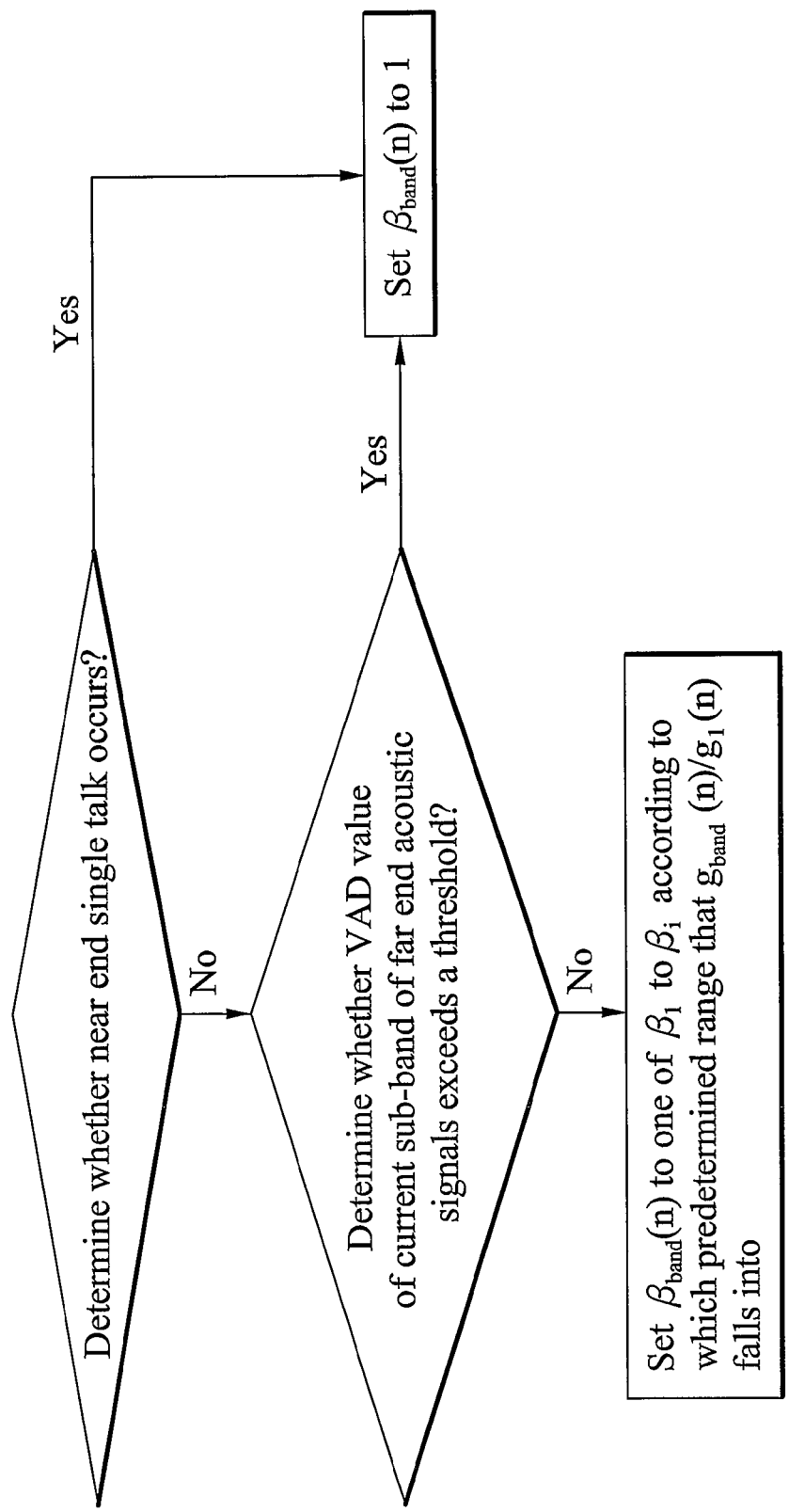
FIG. 5 is a flowchart illustrating an embodiment of a method for determining an adjustment value.

FIG. 5 is a flowchart illustrating an embodiment of a method for determining an adjustment value. The nonlinear effect calculator (62_1, 62_1, . . . , or 62_M) sets $\beta_{band}(n)$ to one when it is detected that near end single talk has occurred, or when it is detected that far end single talk or doubletalk has occurred and a voice activity detection (VAD) value of a corresponding sub-band of the $n^{th}$ acoustic frame at a far end exceeds a predetermined threshold. That is, in these situations, the nonlinear effect calculator ($62\_1, 62\_1, \ldots,$ or $62\_M$) does not adjust a suppression gain value of the sub-band of the $n^{th}$ acoustic frame calculated by a corresponding preliminary suppression gain calculator. Those skilled in the art may employ a well-known VAD algorithm to extract at least one measured feature or quantity from a particular sub-band of the $n^{th}$ acoustic frame at a far end and to compare the value with a threshold, usually extracted from the characteristics of the noise and speech signals. Then, the VAD decision is made if the measured value exceeds the predetermined threshold. Otherwise, the nonlinear effect calculator ($62\_1, 62\_1, \ldots,$ or $62\_M$) would determine $\beta_{band}(n)$ by feeding calculated suppression gains $g_{band}(n)$ and $g_1(n)$ into the suppression gain adjustment model 56 when detecting that far end single talk or doubletalk has occurred and a VAD value of the corresponding sub-band of the $n^{th}$ acoustic frame at a far end does not exceed the predetermined threshold. It is to be understood that $g_1(n)$ represents a suppression gain value of sub-band 1 of the $n^{th}$ acoustic frame.

Specifically, the nonlinear effect calculator ($62\_1, 62\_2, \ldots,$ or $62\_M$) determines $\beta_{band}(n)$ as one of a plurality of predetermined adjustment values by detecting which predetermined range a proportion of $g_{band}(n)$ to $g_1(n)$ falls into. The suppression gain adjustment model 65 may be represented by a mathematical equation or a look-up table. An embodiment of a look-up table, as shown in FIG. 6, describes four predetermined adjustment values $\beta_1$ to $\beta_4$ each corresponding to a range between $\alpha_i$ and $\alpha_{i+1}$. Those skilled in the art may realize more or less determination scales according to various design requirements. For example, the nonlinear effect calculator ($62\_1, 62\_1, \ldots,$ or $62\_M$) sets $\beta_{band}(n)$ as $\beta_1$ when a proportion of $g_{band}(n)$ to $g_1(n)$ equals or exceeds $\alpha_i$, and is lower than $\alpha_2$. The settings of $\beta_{band}(n)$ as $\beta_2, \beta_3$ and $\beta_4$ may be deduced by analogy. It is to be understood that the sub-band suffers a greater extent of nonlinear echo with a greater proportion of $g_{band}(n)$ to $g_1(n)$, resulting in $\beta_{band}(n)$ to be set as a smaller value in order to remove more nonlinear echo. For example, $\alpha_1$ to $\alpha_5$ may be set to 8, 4, 2, 1, 0.5, respectively while $\beta_0$ to $\beta_5$ are 0.0625, 0.125, 0.25, 0.5, 0.75 and 1, respectively. It is to be understood that occurrence of near end single talk, far end single talk or doubletalk is determined by the DTD 64. As a result, a final output suppression gain value of a particular sub-band of the $n^{th}$ acoustic frame is $g_{band}(n)$ multiplied by $\beta_{band}(n)$.

Figure 7:
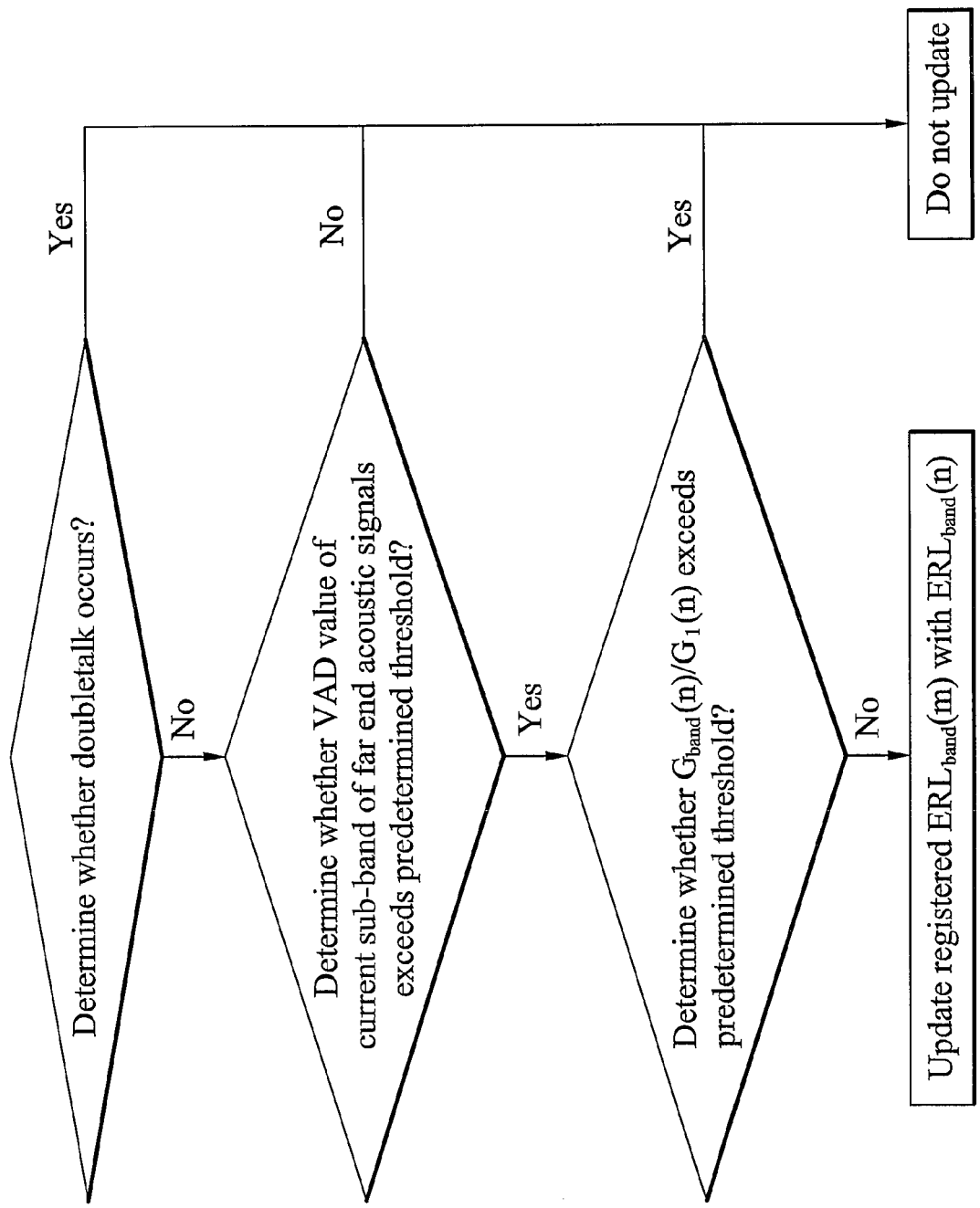
FIG. 7 is a flowchart illustrating an embodiment of a method for determining refresh of an echo return loss (ERL).

The measure refresh unit 54, for a particular sub-band of the $n^{th}$ acoustic frame, first acquires several magnitudes such as signals indicating whether doubletalk occurs, a VAD value, $g_{band}(n), g_1(n)$ or others, from the suppression gain controller 53, and then, determines whether the registered $ERL_{band}$ of the $m^{th}$ acoustic frame is required to be replaced with the current $ERL_{band}$ of the $n^{th}$ acoustic frame. FIG. 7 is a flow-chart illustrating an embodiment of a method for determining whether ERL refresh is required, which is employed in the measure refresh unit 54. The registered $ERL_{band}(m)$ is updated with $ERL_{band}(n)$ when doubletalk does not occur, the VAD value of the corresponding sub-band of $n^{th}$ acoustic frame at a far end exceeds a predetermined threshold, and a proportion of $g_{band}(n)$ to $g_1(n)$ does not exceed a predetermined threshold. Otherwise, the registered $ERL_{band}(m)$ is not updated.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An acoustic echo cancellation method, comprising:
   generating a first suppression gain of a first sub-band of an $N^{th}$ acoustic frame;
   generating a second suppression gain of a second sub-band of the $N^{th}$ acoustic frame; and
   adjusting the second suppression gain of the second sub-band of the $N^{th}$ acoustic frame according to the first suppression gain of the first sub-band of the $N^{th}$ acoustic frame, wherein adjusting the second suppression gain of the Nth acoustic frame comprises:
   detecting which determined range that a proportion of the second suppression gain of the Nth acoustic frame to the first suppression gain of which falls into;
   determining an adjustment value according to the detected determined range; and
   multiplying the second suppression gain of the second sub-band of the Nth acoustic frame by the determined adjustment value.

2. The acoustic echo cancellation method as claimed in claim 1, wherein the second suppression gain of the second sub-band of the $N^{th}$ acoustic frame is adjusted when far end single talk or doubletalk occurs.

3. The acoustic echo cancellation method as claimed in claim 1, wherein the second suppression gain of the second sub-band of the $N^{th}$ acoustic frame is adjusted when far end single talk or doubletalk occurs, and when a voice activity detection (VAD) value of far end acoustic signals of the second sub-band of the $N^{th}$ acoustic frame does not exceed a first predetermined threshold.

4. The acoustic echo cancellation method as claimed in claim 1, wherein the first and second suppression gains of the first and second sub-bands of the $N^{th}$ acoustic frame are generated according to a formula of $$g_{band}(n) = 1 - \frac{E_{band}^x(n) \times ERL_{band}}{E_{band}^r(n)},$$

wherein n represents a frame index, $g_{band}(n)$ represents a suppression gain for a particular sub-band of the $n^{th}$ acoustic frame, $E_{band}^x(n)$ represents a magnitude of far end acoustic signals of the particular sub-band of the $N^{th}$ acoustic frame, $E_{band}^r(n)$ represents energy of near end acoustic signals which have undergone a linear acoustic echo cancellation of the particular sub-band of the $N^{th}$ acoustic frame, and $ERL_{band}$ represents an echo return loss value according to the particular sub-band of an $M^{th}$ acoustic frame, and M<N.

5. The acoustic echo cancellation method as claimed in claim 4, wherein the echo return loss value $ERL_{band}$ is obtained by a formula of $$ERL_{band}(m) = \frac{E_{band}^r(m)}{E_{band}^x(m)};$$

wherein m represents a frame index, $E_{band}^r(m)$ represents energy of near end acoustic signals which have undergone a linear acoustic echo cancellation of the particular sub-band of the $M^{th}$ acoustic frame, and $E_{band}^x(m)$ represents far end acoustic signals of the particular sub-band of the $M^{th}$ acoustic frame.

6. The acoustic echo cancellation method as claimed in claim 1, further comprising:
updating an energy ratio of near end acoustic signals which have undergone a linear acoustic echo cancellation to far end acoustic signals of the second sub-band of an $M^{th}$ acoustic frame by that of the $N^{th}$ acoustic frame for adjusting the second suppression gain of the second sub-band of a $K^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, wherein M<N<K.

7. An acoustic echo cancellation method, comprising:
generating a first suppression gain of a first sub-band of an $N^{th}$ acoustic frame;
generating a second suppression gain of a second sub-band of the $N^{th}$ acoustic frame; and
updating an energy ratio of near end acoustic signals which have undergone a linear acoustic echo cancellation to far end acoustic signals of the second sub-band of an $M^{th}$ acoustic frame by that of the $N^{th}$ acoustic frame for adjusting the second suppression gain of the second sub-band of a $K^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, wherein M<N<K.

8. An acoustic echo cancellation system, comprising:
a nonlinear detection and adjustment unit comprising:
at least two preliminary suppression gain calculators generating first and second suppression gains of first and second sub-bands of an $N^{th}$ acoustic frame; and
at least one nonlinear effect calculator adjusting the second suppression gain of the second sub-band of the $N^{th}$ acoustic frame according to the first suppression gain of the first sub-band of the $N^{th}$ acoustic frame with at least one adder
wherein the two preliminary suppression gain calculators generate the first and second suppression gains of first and second sub-bands of an $N^{th}$ acoustic frame according to a formula of $$g_{band}(n) = 1 - \frac{E_{band}^x(n) \times ERL_{band}}{E_{band}^r(n)},$$

wherein n represents a frame index, $g_{band}(n)$ represents a suppression gain for a particular sub-band of the $n^{th}$ acoustic frame, $E_{band}^x(n)$ represents a magnitude of far end acoustic signals of the particular sub-band of the $N^{th}$ acoustic frame, $E_{band}^r(n)$ represents energy of near end acoustic signals which have undergone a linear acoustic echo cancellation of the particular sub-band of the $N^{th}$ acoustic frame, and $ERL_{band}$ represents an echo return loss value according to the particular sub-band of an $M^{th}$ acoustic frame, and M<N.

9. The acoustic echo cancellation system as claimed in claim 8, further comprising a linear acoustic echo canceller performing a linear acoustic echo cancellation to near end acoustic signals of the first and second sub-bands of the $N^{th}$ acoustic frame with one or more adders.

10. The acoustic echo cancellation system as claimed in claim 8, wherein the echo return loss value $ERL_{band}$ is obtained by a formula of $$ERL_{band}(m) = \frac{E_{band}^r(m)}{E_{band}^x(m)},$$

wherein m represents a frame index, $E_{band}^r(m)$ represents energy of near end acoustic signals which have undergone a linear acoustic echo cancellation of the particular sub-band of the $M^{th}$ acoustic frame, and $E_{band}^x(m)$ represents far end acoustic signals of the particular sub-band of the $M^{th}$ acoustic frame.

11. The acoustic echo cancellation system as claimed in claim 8, wherein the nonlinear detection and adjustment unit further comprises a doubletalk detection unit detecting whether far end talk, near end talk or doubletalk occurs and outputting a detected result to the preliminary suppression gain calculators.

12. The acoustic echo cancellation method as claimed in claim 11, wherein the nonlinear detection and adjustment unit further detects a voice activity detection value of far end acoustic signals of the second sub-band of the $N^{th}$ acoustic frame to adjust the second suppression gain of the second sub-band of which, when far end single talk or doubletalk occurs, and when the detected voice activity detection value does not exceed a first predetermined threshold.

13. The acoustic echo cancellation system as claimed in claim 8, further comprising a measure refresh unit updating an energy ratio of near end acoustic signals which have undergone a linear acoustic echo cancellation to far end acoustic signals of the second sub-band of an $M^{th}$ acoustic frame stored in a register by that of the $N^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, such that the suppression gain controller adjusts the second suppression gain of the second sub-band of a $K^{th}$ acoustic frame, wherein M<N<K.

14. An acoustic echo cancellation system, comprising:
a nonlinear detection and adjustment unit generating first and second suppression gains of first and second sub-bands of an $N^{th}$ acoustic frame; and
a measure refresh unit updating an energy ratio of near end acoustic signals which have undergone a linear acoustic echo cancellation to far end acoustic signals of the second sub-band of an $M^{th}$ acoustic frame stored in a register by that of the $N^{th}$ acoustic frame, when doubletalk does not occur, when a voice activity detection value of the second sub-band of the $N^{th}$ acoustic frame exceeds a first predetermined threshold, and when a proportion of the first suppression gain of the first sub-band of the $N^{th}$ acoustic frame to the second suppression gain of the second sub-band of which does not exceed a second predetermined threshold, such that the suppression gain controller adjusts the second suppression gain of the second sub-band of a $K^{th}$ acoustic frame, wherein M<N<K.

15. The acoustic echo cancellation method as claimed in claim 14, wherein the nonlinear detection and adjustment unit comprises:
   at least one nonlinear effect calculator detecting which determined range that a proportion of the second suppression gain of the $N^{th}$ acoustic frame to the first suppression gain of which falls into, and determining an adjustment value according to the detected determined range; and
   at least one multiplier multiplying the second suppression gain of the second sub-band of the $N^{th}$ acoustic frame by the determined adjustment value.

16. The acoustic echo cancellation system as claimed in claim 15, wherein the nonlinear detection and adjustment unit further comprises a doubletalk detection unit detecting whether far end talk, near end talk or doubletalk occurs and outputting a detected result to the preliminary suppression gain calculators.

17. The acoustic echo cancellation method as claimed in claim 16, wherein the nonlinear detection and adjustment unit further detects a voice activity detection value of far end acoustic signals of the second sub-band of the $N^{th}$ acoustic frame, and the nonlinear detection and adjustment unit adjusts the second suppression gain of the second sub-band of which when far end single talk or doubletalk occurs, and when the detected voice activity detection value does not exceed the first predetermined threshold.

* * * * *